United States Patent
Mancka et al.

(10) Patent No.: US 10,137,411 B2
(45) Date of Patent: Nov. 27, 2018

(54) METHOD OF PREPARING AN STT-TYPE ZEOLITE FOR USE AS A CATALYST IN SELECTIVE CATALYTIC REDUCTION REACTIONS

(71) Applicants: Manjola Mancka, Dexter, MI (US); Yunkui Li, Ann Arbor, MI (US); Jeffery Lachapelle, Northville, MI (US); Wei Wu, Ann Arbor, MI (US)

(72) Inventors: Manjola Mancka, Dexter, MI (US); Yunkui Li, Ann Arbor, MI (US); Jeffery Lachapelle, Northville, MI (US); Wei Wu, Ann Arbor, MI (US)

(73) Assignee: Pacific Industrial Development Corporation, Ann Arbor, MI (US)

(*) Notice: Subject to any disclaimer, the term of this patent is extended or adjusted under 35 U.S.C. 154(b) by 503 days.

(21) Appl. No.: 14/669,197

(22) Filed: Mar. 26, 2015

(65) Prior Publication Data
US 2015/0196876 A1   Jul. 16, 2015
US 2017/0043294 A9   Feb. 16, 2017

Related U.S. Application Data

(63) Continuation of application No. PCT/US2013/062075, filed on Sep. 27, 2013.
(Continued)

(51) Int. Cl.
*B01D 53/94* (2006.01)
*B01J 29/06* (2006.01)
(Continued)

(52) U.S. Cl.
CPC ..... *B01D 53/9418* (2013.01); *B01D 53/9431* (2013.01); *B01J 29/061* (2013.01);
(Continued)

(58) Field of Classification Search
None
See application file for complete search history.

(56) References Cited

U.S. PATENT DOCUMENTS 4,859,442 A   8/1989   Zones
4,936,977 A   6/1990   Zones
(Continued)

FOREIGN PATENT DOCUMENTS

EP   0231018 A2   8/1987
JP   S62216914 A   9/1987
(Continued)

OTHER PUBLICATIONS

International Search Report for PCT/US2013/062075 dated Feb. 6, 2014.

*Primary Examiner* — Colin W. Slifka
(74) *Attorney, Agent, or Firm* — Brinks Gilson & Lione (57) ABSTRACT

A method of preparing a crystalline STT-type zeolite that has a mole ratio greater than about 15:1 of a tetravalent element oxide to a trivalent element oxide is disclosed along with a gas treatment system that incorporates the STT-type zeolite and a process for treating a gas using the STT-type zeolite. The method generally comprises forming an aqueous mixture comprising a tetravalent element oxide source, a trivalent element oxide source, a source of alkali metal, and an organic structure directing agent; maintaining the mixture under conditions that crystallize crystals of a STT-type zeolite; and recovering the crystals The STT-type zeolite crystals exhibit x-ray diffraction 2-theta degree peaks at: 8.26, 8.58, 9.28, 9.54, 10.58, 14.52, 15.60, 16.43, 17.13, 17.74, 18.08, 18.46, 19.01, 19.70, 20.12, 20.38, 20.68, 21.10, 21.56, 22.20, 22.50, 22.78, 23.36, 23.76, 23.99, 24.54, 24.92, 25.16, 25.58, 25.80, 26.12, 26.94, 27.38, (Continued)

27.92, 28.30, 28.60, 29.24, 29.48, 30.08, 30.64, 31.20, 31.46, 31.80, 32.02, 32.60, 33.60, and 34.43.

15 Claims, 7 Drawing Sheets

Related U.S. Application Data (60) Provisional application No. 61/707,392, filed on Sep. 28, 2012.

(51) Int. Cl.
  *B01J 29/70*  (2006.01)
  *B01J 29/76*  (2006.01)
  *B01J 37/08*  (2006.01)
  *B01J 37/30*  (2006.01)
  *C01B 39/48*  (2006.01)
  *B01J 29/72*  (2006.01)
  *C01B 37/02*  (2006.01)
  *C01B 39/02*  (2006.01)
  *B01J 35/00*  (2006.01)

(52) U.S. Cl.
  CPC ........... *B01J 29/70* (2013.01); *B01J 29/7049* (2013.01); *B01J 29/72* (2013.01); *B01J 29/76* (2013.01); *B01J 35/002* (2013.01); *B01J 37/08* (2013.01); *B01J 37/30* (2013.01); *C01B 37/02* (2013.01); *C01B 39/026* (2013.01); *C01B 39/48* (2013.01); *B01D 2255/50* (2013.01); *B01J 2229/16* (2013.01); *B01J 2229/183* (2013.01); *B01J 2229/186* (2013.01); *B01J 2229/37* (2013.01); *B01J 2229/40* (2013.01)

(56) References Cited

U.S. PATENT DOCUMENTS

| 5,202,014 | A | 4/1993 | Zones | |
| 9,656,254 | B2 | 5/2017 | Bull et al. | |
| 2002/0034471 | A1* | 3/2002 | Jacobsen | B01J 29/0308 423/700 |
| 2007/0286798 | A1 | 12/2007 | Cao | |
| 2009/0050527 | A1* | 2/2009 | Krishnamoorthy | B01J 29/068 208/120.05 |
| 2011/0137093 | A1* | 6/2011 | Martens | C23C 16/20 585/310 |
| 2012/0059139 | A1 | 3/2012 | Hayashi et al. | |
| 2012/0184429 | A1* | 7/2012 | Andersen | B01D 53/9418 502/61 |

FOREIGN PATENT DOCUMENTS

| JP | H04180836 A | 6/1992 |
| JP | H05212286 A | 8/1993 |
| JP | H0788379 A | 4/1995 |
| JP | 2010519037 A | 6/2010 |
| JP | 2011079819 A | 4/2011 |
| JP | WO2010128644 A1 | 11/2012 |
| WO | 03/020641 | 3/2003 |
| WO | 2008/106519 | 9/2008 |
| WO | 2010/054034 | 5/2010 |
| WO | 2012007874 A1 | 1/2012 |
| WO | 2013/022513 | 2/2013 |
| WO | 2013130240 | 9/2013 |

* cited by examiner

METHOD OF PREPARING AN STT-TYPE ZEOLITE FOR USE AS A CATALYST IN SELECTIVE CATALYTIC REDUCTION REACTIONS

CROSS REFERENCE TO RELATED APPLICATIONS

This application is a continuation of PCT Application Serial No. PCT/US2013/062075 filed Sep. 27, 2013, designating the United States and published in English, which claims the benefit of the filing date under 35 U.S.C. § 119(e) of U.S. Provisional Application No. 61/707,392 filed Sep. 28, 2012, the entire contents of each of which are hereby incorporated herein by reference.

FIELD

This disclosure relates to a method of forming an STT-type zeolite and using said zeolite as a catalyst in Selective Catalytic Reduction (SCR) reactions.

BACKGROUND

The statements in this section merely provide background information related to the present disclosure and may not constitute prior art.

A zeolite is a crystalline aluminosilicate having a framework based on an extensive three dimensional network of oxygen ions. The fundamental building block of all zeolites is a tetrahedron of four oxygen anions surrounding a small silicon or aluminum ion. These tetrahedra are arranged so that each of the four oxygen anions is shared in turn with another silica or alumina tetrahedron. The crystal lattice extends in three-dimension, and the −2 charge, i.e., oxidation state, of each oxygen anion is accounted for. Each silicon ion has its +4 charge, balanced by the four tetrahedral oxygen anions, and the silica tetrahedral are therefore electrically neutral. Each aluminum tetrahedron has a −1 residual charge since the trivalent aluminum is bonded to four oxygen anions. This residual charge is balanced by cations that occupy non-framework positions and act as strong, acid-donating Brønsted sites as further described in the schematic below and in *Molecular Sieves: Principles of Synthesis and Identification* authored by R. Szostak, 2nd edition, Blackie Academic and Professional, London, 1998.

High-silica containing zeolites or molecular sieves are typically prepared from an aqueous reaction mixture containing sources of an alkaline metal or an alkaline earth metal oxide; sources of an oxide of silicon; optionally sources of aluminum oxide; and a cation derived from 1-Adamantamine, its derivative N,N,N-trimethyl-1-adamantamonium hydroxide, and mixtures thereof. Fumed silica is used as the typical source of silicon oxide, while aluminum hydroxide is used as the typical source of aluminum oxide. The "as synthesized" crystalline zeolite formed by crystallization may then be subjected to further treatment. For example, the structure directing agent (SDA) can be removed by thermal treatment (i.e. calcination). Such further treatments include the removal of the metal cation by ion-exchange using known methods such as using a diluted acid solution or ammonium nitrate solutions.

Y. Nakagawa et al, in *Microporous and Mesoporous Materials*, 22 (1998) p. 69-85 have computationally determined five different zeolites that can be made using the N,N,N-trimethyl-1-adamantamonium cation. Their molecular modeling calculations agree with their experimental data. They have reported that this template crystallizes SSZ-13, SSZ-23, SSZ-24, SSZ-25, and SSZ-31 type of zeolites. They show the crystallization field boundaries for the five zeolites commonly made by two SDA's. N,N,N-trimethyl-1-adamantamonium SDA molecule crystallizes chabazite phase at SAR 10-40, while STT phase at SAR 50-70.

Very few organic templates will produce structures similar to that of the SSZ-23 type zeolite. U.S. Pat. No. 4,859,442 discloses the preparation of crystalline SSZ-23 zeolite using adamantine quaternary ammonium ion as a template. The SSZ-23 zeolite so prepared has a mole ratio of an oxide selected from silicon oxide, germanium oxide, and mixture thereof to an oxide selected from aluminum oxide, gallium oxide, iron oxide, boron oxide and mixtures thereof greater than about 50:1.

SUMMARY

The present disclosure generally provides a selected synthesis reaction that expands the ability to form zeolites having a structure similar to the SSZ-23 zeolite. It is surprising that structures similar to the SSZ-23 zeolite emerge as the product (SST-type zeolites) under the type of reaction and specific set of synthesis conditions described herein. The STT-type zeolites prepared according to the teachings of the present disclosure have a mole ratio of an oxide of a tetravalent element to an oxide of a trivalent element that is greater than about 15:1. Alternatively, the oxide of the tetravalent element is silicon oxide and the oxide of the trivalent element is aluminum oxide with a ratio of 10:1 to 30:1.

The method for preparing a crystalline STT-type zeolite generally comprises forming an aqueous reaction mixture comprising a source of an oxide of the tetravalent element, a source of an oxide of the trivalent element, a source of alkali metal, and an organic structure directing agent comprising N,N,N-trimethyl-1-adamantamonium hydroxide; maintaining the aqueous mixture under crystallization conditions sufficient to crystallize crystals of a STT-type zeolite; and recovering the STT-type zeolite crystals. The STT-type zeolite crystals exhibit an x-ray diffraction pattern (2 theta degree) with peaks at: 8.26, 8.58, 9.28, 9.54, 10.58, 14.52, 15.60, 16.43, 17.13, 17.74, 18.08, 18.46, 19.01, 19.70, 20.12, 20.38, 20.68, 21.10, 21.56, 22.20, 22.50, 22.78, 23.36, 23.76, 23.99, 24.54, 24.92, 25.16, 25.58, 25.80, 26.12, 26.94, 27.38, 27.92, 28.30, 28.60, 29.24, 29.48, 30.08, 30.64, 31.20, 31.46, 31.80, 32.02, 32.60, 33.60, and 34.43.

The STT-type zeolites prepared according to the method of the present disclosure may be used as a catalyst, such as in SCR applications. The comparison of Temperature Programmed Desorption (TPD) studies for both ammonia and n-propylamine using the STT-type zeolites prepared according to the teachings of the present disclosure demonstrates that these zeolites have a structure similar to SSZ-23 zeolites. In TPD measurements, the acid strength of the synthesized zeolite is monitored by using probe molecules having basic character, such as ammonia and n-propylamine, and measuring the temperature at which they are desorbed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the description, corresponding reference numerals indicate like or corresponding parts and features.

The present disclosure generally provides a method of preparing crystalline zeolites having an STT-type structure or framework, which is similar to that of SSZ-23 zeolites. STT-type zeolites prepared herein exhibit catalytic activity for Selective Catalytic Reduction (SCR) reactions similar to the activity exhibited by SSZ-23 zeolites, as demonstrated by ammonia and N-propylamine temperature desorption studies. The empirical gel composition for the SSZ-23 zeolite is represented as:

5.577NaOH:4.428RNOH:Al$_2$O$_3$:28SiO$_2$:1219.7H$_2$O.

The following specific embodiments are given to illustrate the preparation, identification, and use of STT-type zeolites prepared according to the teachings of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Figure 1:
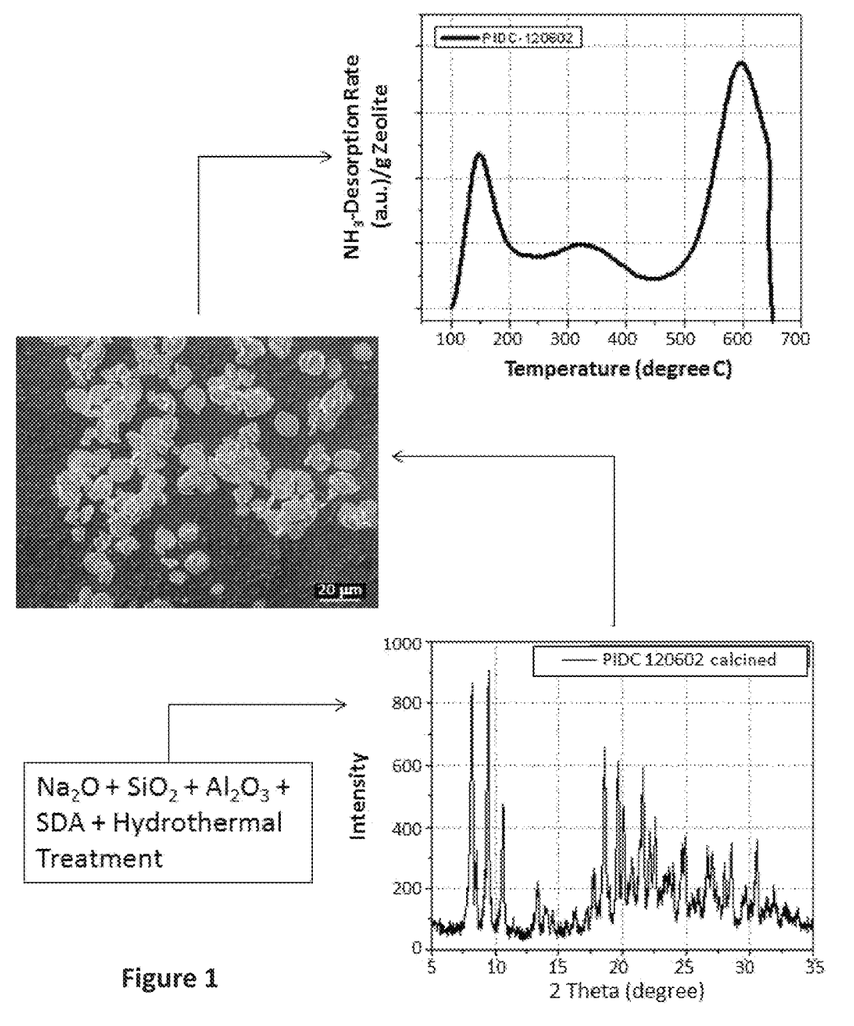
FIG. 1 is a schematic view of the preparation of a STT-type zeolite according to the teachings of the present disclosure.

Referring to FIG. 1, the STT-type zeolites of the present disclosure are generally prepared by stirring the reactants until a homogeneous milky solution is obtained. The synthesis of the zeolite crystals is carried out in a 2.0 L Parr autoclave at 150° C. to 160° C. for 4 to 7 days, alternatively, at about 155° C. for about 6 days. Upon cooling, the contents of the reactor vessel are poured into a filter and the crystals washed with distilled water and dried overnight at about 120° C. After synthesis, the zeolite is calcined before ion exchange in order to remove the zeolite framework structure-directing agent. The resulting zeolite exhibits a mole ratio of an oxide of a tetravalent element to an oxide of a trivalent element that is greater than about 15:1. Alternatively, the zeolite exhibits a silica:alumina mole ratio between about 10:1 and 30:1; alternatively about 28:1. The resulting products are characterized by XRD. The patterns are obtained from 5 to 35° 2θ scan using a step size of 0.02° 2θ. Scanning electron microscopy (SEM) images and energy-dispersive X-ray spectroscopy (EDAX) chemical analysis are obtained using a Carl-Zeiss microscope. Temperature desorption studies are carried out on a 2920 Micromeritics instrument coupled with a MKS Cirrus Mass Spectrometer. All synthesized materials are white powders.

According to one aspect of the present disclosure, the STT-type zeolite has a particle size with D50 between about 0.1 to 50 micrometers. The source of the tetravalent element may be fumed silica with a water content of about 2 wt %, while the source of trivalent element is aluminum trihydroxide. The alkali metal cation balances the valence electrons charges in the crystalline STT-type zeolite. The alkali metal cation may be sodium derived from sodium hydroxide or potassium derived from potassium hydroxide.

According to another aspect of the present disclosure a method of preparing a metal containing catalyst is provided; the method comprising the steps of: dealuminating the STT-type zeolite with nitric acid; impregnating the resulting dealuminated zeolite with an aqueous solution of a metal salt, the metal being selected as one from the group of Cu, Fe, Co, Zr, Ti, or a mixture thereof. The metal is incorporated into the framework sites of the dealuminated zeolite.

The metal-containing catalyst is characterized by ammonia temperature desorption and n-propylamine temperature desorption to exhibit catalytic activity equivalent to a metal-containing SSZ-23 zeolite. The metal-containing catalyst is hydrothermally aged; the hydrothermally aged catalyst capable of both ammonia temperature desorption and n-propylamine temperature desorption. The step of incorporating the metal in to the framework of the dealuminated zeolite is accomplished by ion-exchange with the amount of Cu, Fe, Co, Zr, Ti metal being sufficient to maintain NOx conversion performance in an exhaust gas stream containing nitrogen oxides. The amount of metal present in this metal-containing catalyst can range from 0.3 to 10.0%, alternatively from about 0.3 to about 5.0%, based on the total weight of the metal-containing catalyst.

The NOx conversion performance of the freshly prepared metal-containing catalyst at about 200° C. is 72%, alternatively, about 65%. The NOx conversion performance of the freshly prepared metal-containing catalyst at about 500° C. is about 45%, alternatively, about 30%.

Still referring to FIG. 1, the zeolite materials prepared according to the teachings of the present disclosure may be used as catalysts, such as in SCR applications. The acid strength of the synthesized zeolite samples is monitored by using the probe molecules with basic character, such as ammonia and n-propylammine, by measuring the temperature they are desorbed (temperature programmed desorption measurements). The acidity of the samples are measured by ammonia temperature-programmed desorption, and n-propylamine-TPD techniques. The STT-type zeolite has strong acid sites stable up to a temperature of 600° C.

According to one aspect of the present disclosure, the SCR catalyst can be in the form of individual catalyst particles or as a honeycomb monolith structure. The honeycomb structure may be either formed of the catalyst composition or be a ceramic or metallic substrate, alternatively, an extruded substrate, upon which the catalyst composition is applied as a washcoat or a combination of washcoats. The term "SCR" catalyst as used herein is anticipated to include but not be limited to the selective catalytic reduction reaction in which nitrogen oxides react with a reductant or reducing agent. The reductant or reducing agent refers to any chemical or compound that can reduce $NO_x$ at elevated temperature. The reducing agent may be ammonia or an ammonia precursor, such as urea. The reductant may also be a fuel, such as diesel fuel and fractions thereof, as well as any other hydrocarbons or oxygenated hydrocarbons.

The catalyst compositions can be self-supporting particulate, made into a monolithic structure, or disposed on to any substrate normally used by one skilled in the art to prepare catalysts. The substrate or monolithic structure may comprise any ceramic or metal honeycomb structure that has one or more gas flow passages extending there through. The catalyst composition may be applied to a portion of the structure walls that define said passages such that the gases flowing through the passages contact the catalyst composition. The flow passages are thin-walled channels having any desired cross-sectional shape or size such, including but not limited to, trapezoidal, rectangular, square, oval, and circular. One skilled in the art will understand that the substrate may also be a wall-flow filter substrate, in which the flow passages are alternately blocked, such that the gases are only allowed to flow in one general direction. Thus use of a wall flow substrate provides the added benefit of being able of remove particulate matter from the flowing gases along with gaseous pollutants. The wall-flow filter substrate can be made from materials commonly known in the art, such as cordierite, aluminum titanate or silicon carbide, to name a few. The amount of the catalyst composition that is applied to the wall flow substrate will depend on substrate's properties such as porosity and wall thickness.

According to another aspect of the present disclosure, the SCR catalyst composition may also be used in conjunction with an ammonia oxidation (AMOX) catalyst. AMOX catalysts are useful in exhaust gas treatment systems as a catalyst that interacts with the gaseous stream of oxygen, nitrogen oxides, and ammonia in addition to the SCR catalyst. Ammonia is commonly added to the gaseous stream flowing in a flue or exhaust in order to reduce the emissions of nitrogen oxides generated from an engine via the catalyzed reduction of nitrogen oxides with the ammonia. An SCR catalyst tends to favor the reduction of nitrogen oxides, while an AMOX catalyst favors the decomposition of any excess ammonia. Various other uses of the catalyst composition prepared according to the teachings of the present disclosure is anticipated to be possible without exceeding the scope of the disclosure. For example, an additional description of various uses associated with a metal-containing SSZ-23 zeolite is provided in U.S. Publication No. 2008/0226545, the entire contents of which are hereby incorporated by reference.

Example 1—Synthesis of PIDC-120602 STT-Type Zeolite

Sodium hydroxide solution and N,N,N-trimethyl-1-adamantamonium hydroxide are combined. Aluminum hydroxide is added followed by silica Aerosil 200. To the obtained mixture D.I. water is added. The reactants are stirred until a homogeneous milky solution was obtained. The obtained slurry is transferred into a 2.0 L Parr stainless steel vessel and the vessel is sealed. The reactor vessel is heated at 155° C. for 6 days. Upon cooling, the contents of the reactor vessel are poured into a filter and the crystals are washed with distilled water and dried overnight at 120° C. After synthesis, the zeolites powder is calcined before ion exchange in order to remove the zeolite framework structure-directing agent.

Figure 2:
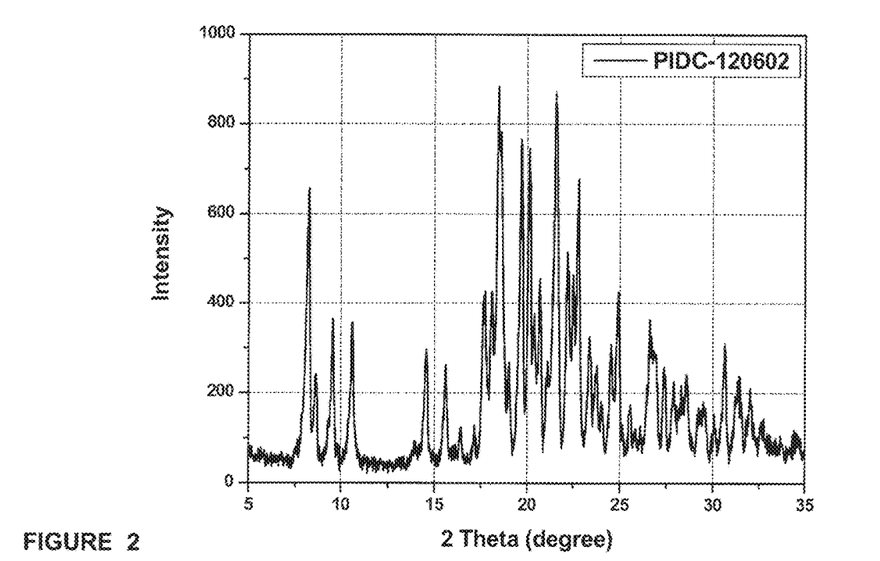
FIG. 2 is an x-ray powder diffraction analysis spectrum of a STT-type zeolite prepared according to Example 1.
Figure 3:
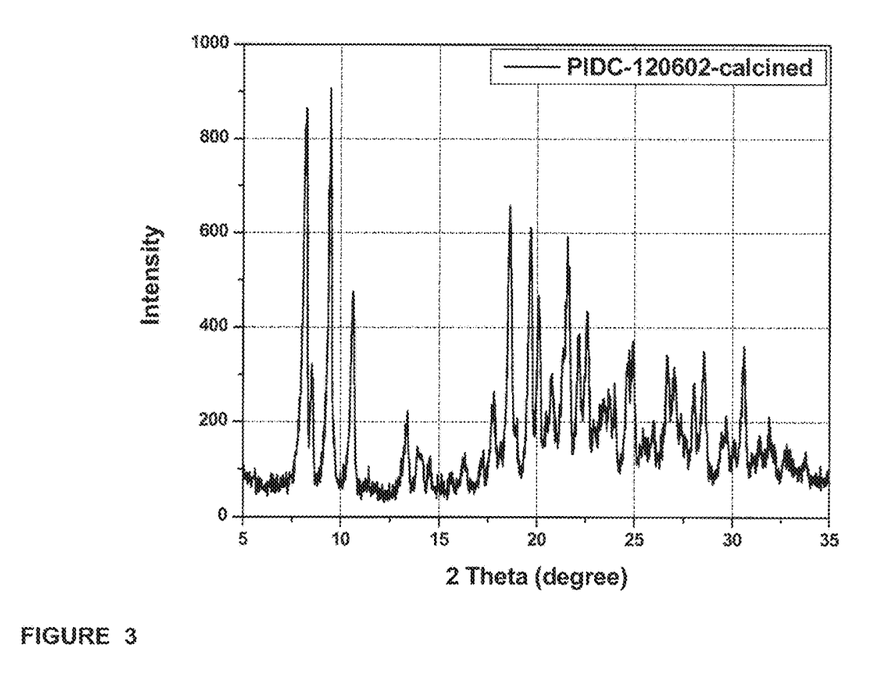
FIG. 3 is an X-ray powder diffraction analysis spectrum of the calcined STT-type zeolite prepared according to Example 1.

The X-ray diffraction pattern of the SSZ-23 zeolite product obtained from this procedure is summarized below in Table 1, as well as being shown in FIG. 2. The XRD pattern demonstrates the presence of a pure SSZ-23 phase with high crystallinity. After calcination the SSZ-23 zeolite has the crystalline structure whose X-ray diffraction pattern is shown in FIG. 3. The XRD spectrum of the calcined sample still exhibits the presence of an SSZ-23 phase. The main peaks in the XRD spectrum with a 2 theta degree at 8.16, 8.52, 9.46, 10.62, 13.31, 13.90, 14.10, 14.50, 15.57, 16.32, 17.22, 17.80, 18.60, 18.99, 19.66, 20.08, 20.49, 20.78, 21.21, 21.58, 22.18, 22.56, 22.97, 23.40, 23.78, 23.98, 24.64, 24.94, 25.47, 25.96, 26.64, 27.04, 27.35, 28.06, 28.56, 29.44, 29.73, 30.09, 30.44, 30.60, 30.99, 31.40, 31.94, 32.67, 33.78, and 34.48 are attributed to the SSZ-23 phase. The SSZ-23 zeolite obtained by the method described here has a BET surface are of about 358 $m^2/g$, and a micropore volume of about 0.18 $cm^3/g$.

Figure 4:
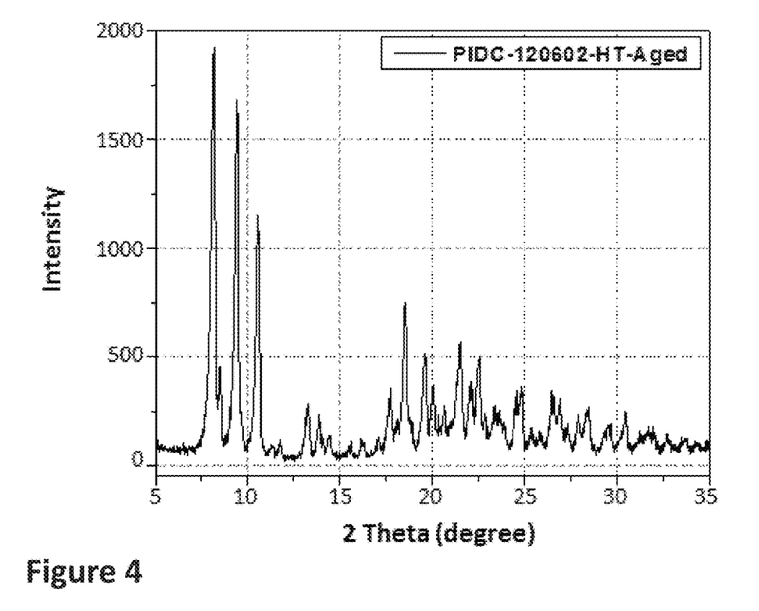
FIG. 4 is an X-ray powder diffraction analysis spectrum of the STT-type zeolite prepared according to Example 2 after being aged at 750° C. for 24 hours in the presence of 10% (w/w) water.

The aging treatment to which the SSZ-23 zeolite is subjected is selected at 750° C. for 24 hours in flowing air containing 10% $H_2O$. The X-ray diffraction (XRD) spectrum of this hydrothermally treated sample is shown in FIG. 4. The XRD spectrum exhibits the characteristic lines for SSZ-23 type zeolite. The main peaks with 2 theta degree at 8.16, 8.50, 9.40, 10.52, 11.27, 11.76, 12.79, 13.26, 13.88, 14.08, 14.46, 15.54, 16.12, 17.10, 17.72, 18.09, 18.50, 18.80, 19.60, 20.04, 20.38, 20.64, 21.48, 22.07, 22.50, 22.79, 23.34, 23.60, 23.80, 24.57, 24.76, 25.34, 25.83, 26.52, 26.94, 27.33, 27.92, 28.45, 29.30, 29.62, 30.46, 31.38, 31.96, 32.75, and 33.66 are attributed to the SSZ-23 phase.

TABLE 1

X-Ray Data for PIDC-120602 (Example 1)

| As synthesized | | | Calcined | | |
|---|---|---|---|---|---|
| 2 Theta | d (nm) | I (%) | 2 Theta | d (nm) | I (%) |
| 8.26 | 1.070 | 7.8 | 8.16 | 1.083 | 90.8 |
| 8.58 | 1.029 | 22.5 | 8.52 | 1.037 | 29.1 |
| 9.28 | 0.952 | 10.7 | 9.46 | 0.934 | 100.0 |
| 9.54 | 0.926 | 40.0 | 10.62 | 0.832 | 49.6 |
| 10.58 | 0.835 | 39.4 | 13.31 | 0.665 | 15.8 |
| 14.52 | 0.609 | 29.1 | 13.90 | 0.636 | 9.7 |
| 15.60 | 0.568 | 26.9 | 14.10 | 0.628 | 8.1 |
| 16.43 | 0.539 | 8.0 | 14.50 | 0.610 | 7.0 |
| 17.13 | 0.517 | 4.6 | 15.57 | 0.569 | 3.8 |
| 17.74 | 0.500 | 47.6 | 16.32 | 0.543 | 9.0 |
| 18.08 | 0.490 | 45.4 | 17.22 | 0.515 | 5.3 |
| 18.46 | 0.480 | 100 | 17.80 | 0.498 | 24.5 |
| 19.01 | 0.466 | 23.2 | 18.60 | 0.477 | 65.9 |
| 19.70 | 0.450 | 87.0 | 18.99 | 0.467 | 12.3 |
| 20.12 | 0.441 | 81.2 | 19.66 | 0.452 | 61.4 |
| 20.38 | 0.435 | 31.1 | 20.08 | 0.442 | 44.3 |
| 20.68 | 0.429 | 41.6 | 20.49 | 0.433 | 7.9 |
| 21.10 | 0.421 | 18.6 | 20.78 | 0.427 | 17.2 |
| 21.56 | 0.412 | 96.8 | 21.21 | 0.419 | 9.2 |
| 22.20 | 0.400 | 52.1 | 21.58 | 0.412 | 52.5 |
| 22.50 | 0.395 | 45.9 | 22.18 | 0.400 | 27.4 |
| 22.78 | 0.390 | 73.6 | 22.56 | 0.394 | 33.4 |
| 23.36 | 0.380 | 29.4 | 22.97 | 0.387 | 3.2 |
| 23.76 | 0.374 | 22.6 | 23.40 | 0.380 | 13.5 |
| 23.99 | 0.371 | 12.8 | 23.78 | 0.374 | 15.4 |
| 24.54 | 0.362 | 29.3 | 23.98 | 0.371 | 20.9 |
| 24.92 | 0.357 | 43.8 | 24.64 | 0.361 | 25.0 |
| 25.16 | 0.354 | 5.6 | 24.94 | 0.357 | 30.2 |
| 25.58 | 0.348 | 10.9 | 25.47 | 0.350 | 5.0 |
| 25.80 | 0.345 | 3.4 | 25.96 | 0.343 | 9.0 |
| 26.12 | 0.341 | 4.4 | 26.64 | 0.334 | 24.9 |
| 26.62 | 0.345 | 34.8 | 27.04 | 0.330 | 22.0 |
| 26.94 | 0.331 | 25.0 | 27.35 | 0.326 | 7.9 |
| 27.38 | 0.326 | 20.8 | 28.06 | 0.318 | 20.4 |
| 27.92 | 0.319 | 17.1 | 28.56 | 0.312 | 29.0 |
| 28.30 | 0.315 | 16.9 | 29.44 | 0.303 | 9.5 |
| 28.60 | 0.312 | 20.4 | 29.73 | 0.300 | 8.6 |
| 29.24 | 0.305 | 12.0 | 30.09 | 0.297 | 8.1 |
| 29.48 | 0.303 | 13.8 | 30.44 | 0.293 | 13.6 |
| 30.08 | 0.297 | 10.9 | 30.60 | 0.292 | 30.3 |
| 30.64 | 0.292 | 30.8 | 30.99 | 0.288 | 3.6 |
| 31.20 | 0.286 | 15.0 | 31.40 | 0.285 | 9.2 |
| 31.46 | 0.284 | 20.9 | 31.94 | 0.280 | 11.6 |
| 31.80 | 0.281 | 8.4 | 32.67 | 0.274 | 6.0 |
| 32.02 | 0.279 | 16.2 | 33.78 | 0.265 | 5.5 |
| 32.60 | 0.274 | 4.6 | 34.48 | 0.260 | 0.7 |
| 33.60 | 0.267 | 0.6 | | | |
| 34.43 | 0.260 | 5.7 | | | |

Example 2—Temperature Programmed Desorption

Figure 5:
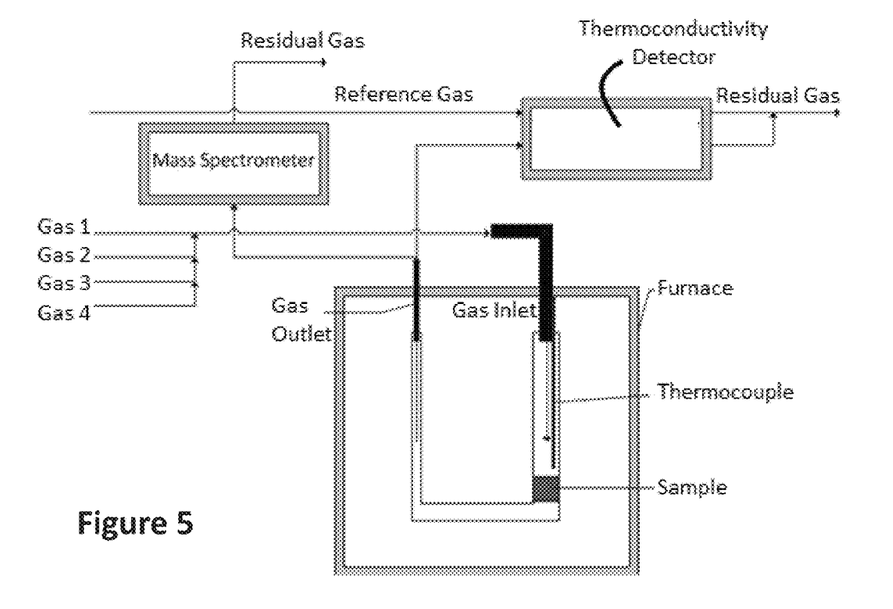
FIG. 5 is a schematic diagram of the TPD instrumentation.

Temperature-programmed desorption of basic molecules $NH_3$ and n-propylamine are applied to study the overall nature and distribution of the acid sites on the SSZ-23 zeolites prepared herein. TPD spectra are recorded on 2920 Micromeritic instrument connected with a thermal conductivity detector (TCD) in MKS Cirrus Mass Spec equipment. The schematic diagram is shown in FIG. 5.

Typically for $NH_3$-TPD, 0.1 g catalyst is pretreated at 500° C. for 30 minutes at a rate of 20° C./min in helium flowing at 25 mL $min^{-1}$ and then cooled to adsorption temperature of 100° C. The catalyst is saturated with diluted ammonia (10% Ammonia/90% Argon) at 100° C. for 30 minutes. After saturation the sample is purged with helium at 25 mL $min^{-1}$, for 20 minutes to remove the weakly adsorbed ammonia on the surface of the zeolite. The temperature of the sample is then raised at a heating rate of 20° C./min from 100° C. to 650° C., with the flow helium maintained at 25 mL $min^{-1}$, and then finally held at 650° C. for 40 minutes. A mass spectrometer is used to monitor desorbed $NH_3$.

Typically, for n-propylamine-TPD, 0.1 g catalyst is pretreated at 500° C. for 30 minutes in helium flowing at 25 mL $min^{-1}$ and then cooled to adsorption temperature of 100° C. The flask containing n-propylamine is heated at 60° C. to generate the n-propylamine vapors. The catalyst is dosed with diluted n-propylamine. Dossing is repeated until the sample is saturated, which is evidenced by the presence of 5 peaks of equal height. After saturation the sample is purged with helium at 25 mL $min^{-1}$, for 20 minutes to remove the weakly adsorbed ammonia on the surface of the zeolite. The temperature of the sample is then raised at a heating rate of 20° C./min from 100° C. to 650° C., while flow helium is at 25 mL $min^{-1}$. A mass spectrometer is used to monitor desorbed n-propylamine.

The $NO_x$ conversion is tested utilizing the Micromeritics 2920 acting as a micro flow reactor and the MKS Residual Gas analyzer which performs the analysis of gas concentrations after passing through the sample. The samples are tested with the follow gas concentrations: NO=175 ppm; $NO_2$=175 ppm; $NH_3$=350 ppm; and $O_2$=175 ppm. The samples are tested under 50,000$^{-1}$/hr space velocity. The $NO_x$ conversion numbers are calculated from a steady state condition after 45 minutes of consistent pressure through the MKS Residual Gas analyzer.

Figure 6:
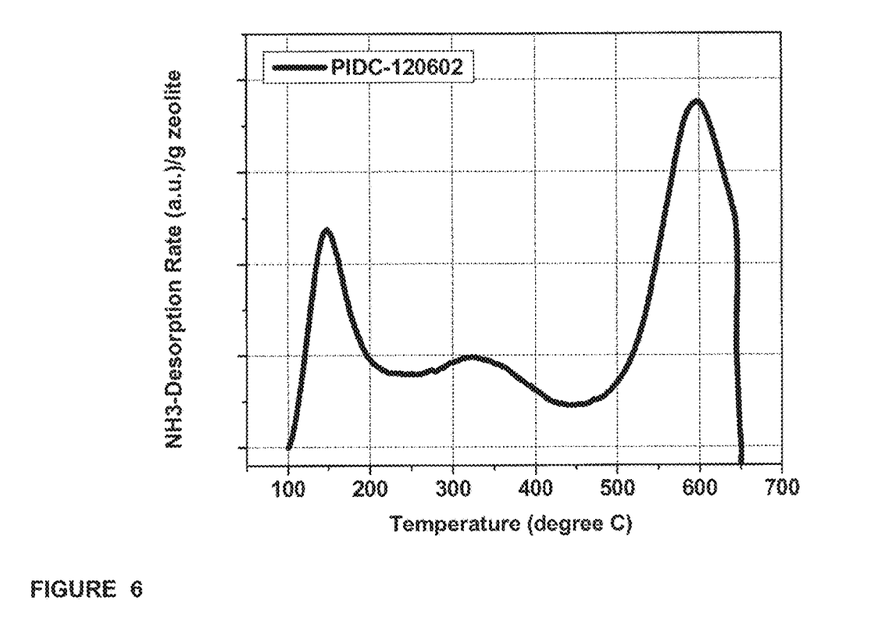
FIG. 6 is a graphical representation of the ammonia desorption profiles exhibited by fresh zeolite samples prepared according to the present disclosure.

The amounts of ammonia desorbed from the three samples are evaluated from their TPD peak areas. (FIG. 6) Three $NH_3$ desorption peaks are present. The $NH_3$ desorption peak at ~160° C. is associated with weak acid sites, a second peak at 340° C. and another peak at higher than 600° C. is associated with strong acid sites, demonstrating the high catalytic activity of the PIDC-120602, of the STT type zeolite material.

Figure 7:
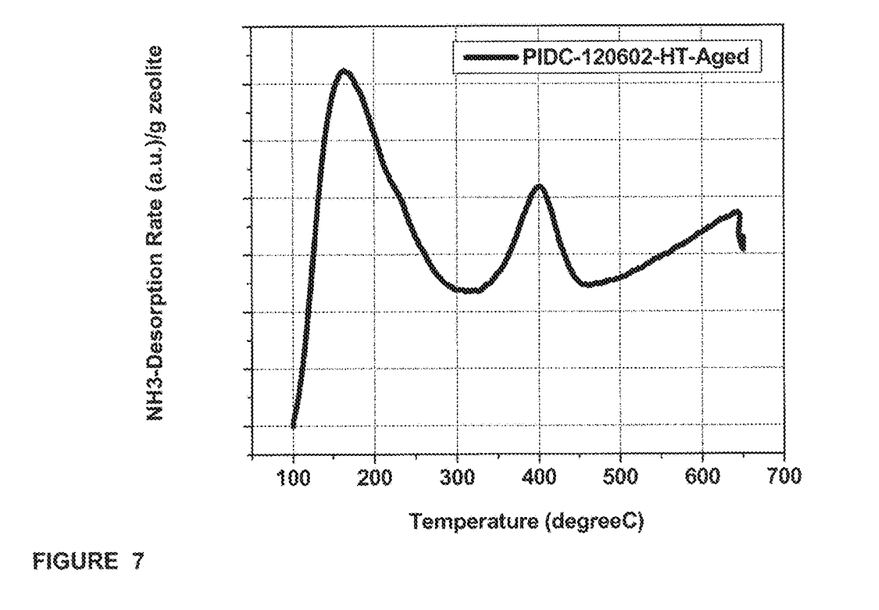
FIG. 7 is a graphical representation of the ammonia desorption profiles exhibited by hydrothermally aged (750° C. for 24 hours, 10% H2O) zeolite samples.

Since the catalyst stability at high temperatures and resistance to $H_2O$, are very important issues for the SCR reaction, the effect of hydrothermal aging on the catalyst performance is investigated. The aging treatment is selected at 750° C. for 24 hours in flowing air containing 10% $H_2O$ by weight. The ammonia desorption profiles of the hydrothermally aged zeolite sample is shown in FIG. 7. It can be seen that SSZ-23 zeolite shows very stable activity at low and middle temperature ranges, while the activity at very high temperature up to 600° C., is decreased significantly.

Figure 8:
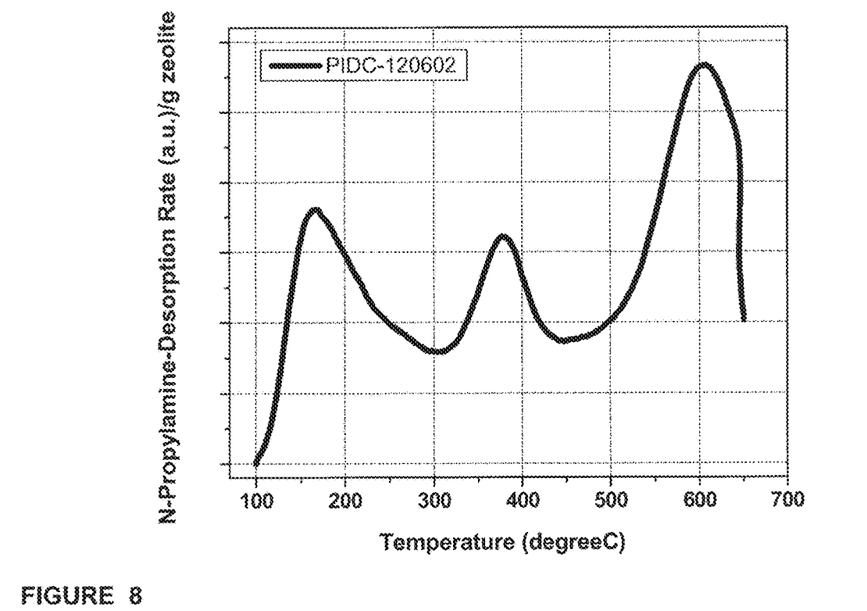
FIG. 8 is a graphical representation of the n-propylamine desorption profiles exhibited by fresh zeolite samples prepared according to the teachings of the present disclosure.
Figure 9:
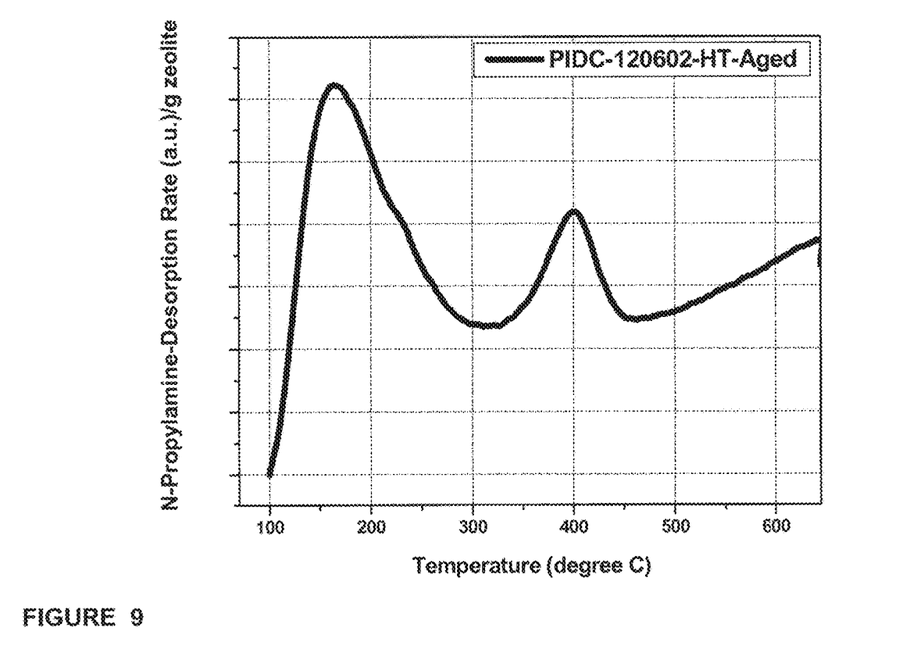
FIG. 9 Is a graphical representation of the n-propylamine desorption profiles exhibited by hydrothermally aged (750° C. for 24 hours with 10% water vapor) zeolite samples.
Figure 10:
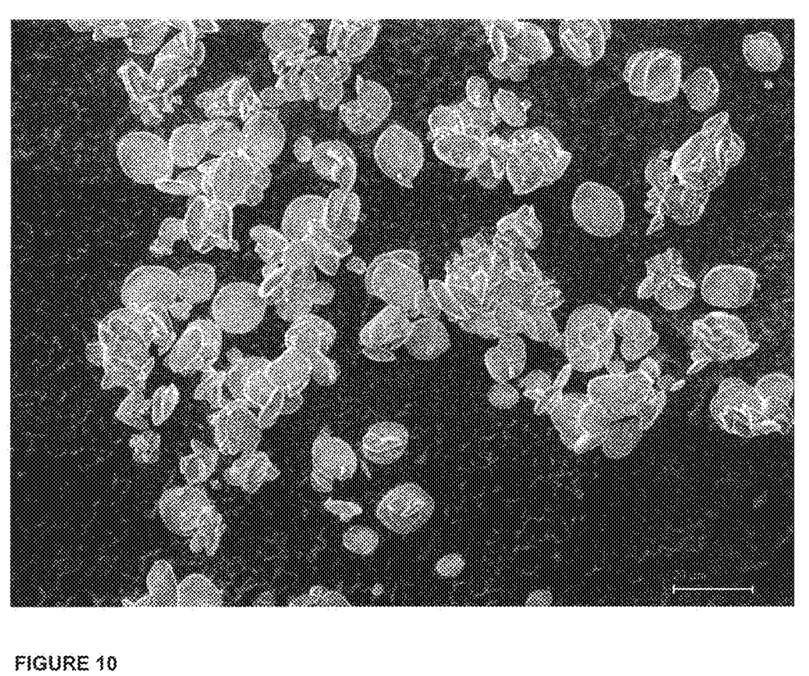
FIG. 10 provides a scanning electron microscope (SEM) image of the STT-type zeolite obtained according to the teachings of the present disclosure.

The results of n-propylamine TPD profiles are shown in FIG. 8 for the fresh samples and FIG. 9 for the aged samples, respectively. The fresh sample exhibits three desorption peaks: at 160° C., 360° C. and 600 C, which suggests the presence of three energetically active types of adsorption sites for n-propylamine on this sample. The higher temperature desorption peak is attributed to stronger interactions of n-propylamine with the silanol groups present at the surface of the zeolite samples.

Figure 11:
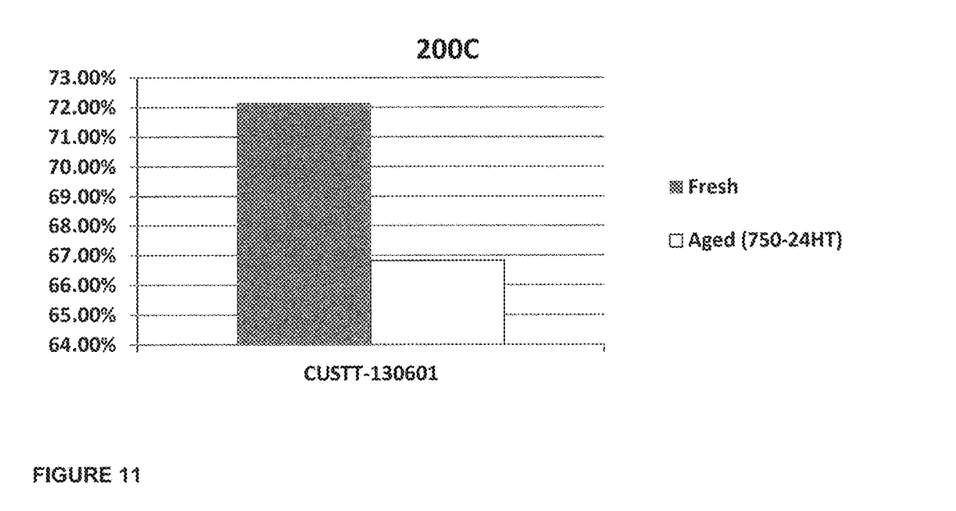
FIG. 11 is a graphical representation of NOx conversion at 200° C. for a fresh STT-type zeolite prepared according to the teaching of the present disclosure and for a sample of the zeolite hydrothermally aged at 750° C. for 24 hours, 10% H$_2$O.
Figure 12:
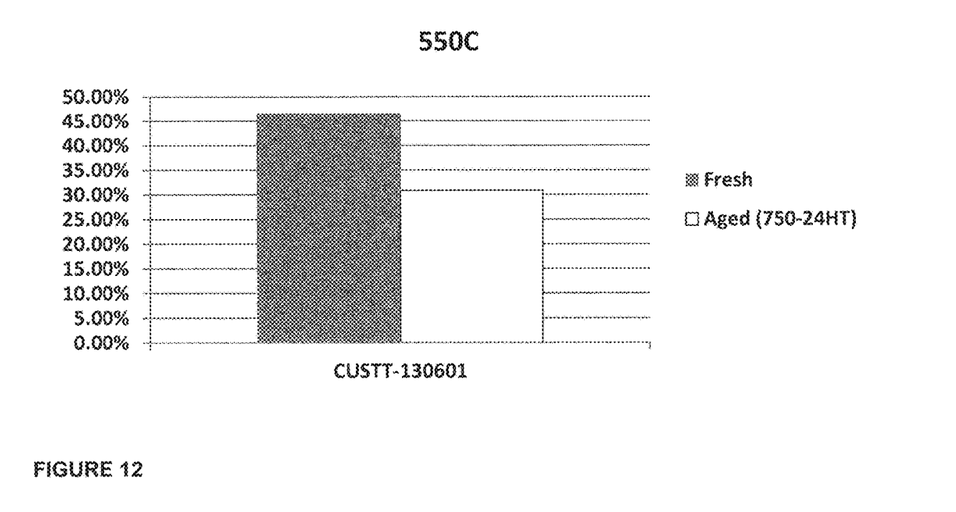
FIG. 12 is a graphical representation of NOx conversion at 500° C. for a fresh STT-type zeolite prepared according to the teaching of the present disclosure and for a sample of the zeolite hydrothermally aged at 750° C. for 24 hours, 10% H2O.

The results of $NO_x$ Conversion are shown in FIG. 11 for fresh samples and in FIG. 12 for aged samples, respectively. The $NO_x$ conversion decreases after aging at both temperatures 200° C. and 550° C. This decrease in $NO_x$ conversion represents a loss in activity due to the decrease in the acidity of the samples after exposure to hydrothermal aging conditions.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for preparing a metal containing catalyst that includes a crystalline STT-type zeolite having a mole ratio of an oxide of a tetravalent element to an oxide of a trivalent element between 10:1 and 30:1, said method comprising:
    forming an aqueous reaction mixture comprising a source of the oxide of tetravalent element; a source of the oxide of the trivalent element; a source of alkali metal; an organic structure directing agent comprising N,N,N-trimethyl-1-adamantammonium hydroxide;
    stirring the aqueous reaction mixture to form a homogeneous aqueous slurry;
    subjecting the homogeneous aqueous slurry to crystallization conditions that include heating the slurry under pressure at a temperature between 150° C. and 160° C. for a period of 4 to 7 days;
    maintaining the homogeneous aqueous slurry under crystallization conditions sufficient to crystallize crystals of the STT-type zeolite having an x-ray diffraction pattern with 2 theta peaks at: 8.26, 8.58, 9.28, 9.54, 10.58, 14.52, 15.60, 16.43, 17.13, 17.74, 18.08, 18.46, 19.01, 19.70, 20.12, 20.38, 20.68, 21.10, 21.56, 22.20, 22.50, 22.78, 23.36, 23.76, 23.99, 24.54, 24.92, 25.16, 25.58, 25.80, 26.12, 26.94, 27.38, 27.92, 28.30, 28.60, 29.24, 29.48, 30.08, 30.64, 31.20, 31.46, 31.80, 32.02, 32.60, 33.60, and 34.43;
    recovering the STT-type zeolite crystals;
    dealuminating the STT-type zeolite with nitric acid;
    impregnating or ion-exchanging the dealuminated STT-type zeolite with an aqueous metal salt solution; and
    incorporating a metal selected as one from the group of Cu, Fe, Co, Zr, Ti, or a mixture thereof into the framework sites of dealuminated STT-type zeolite to form a metal-containing catalyst.

2. The method of claim 1, wherein the recovered STT-type zeolite is SSZ-23.

3. The method of claim 1, wherein the metal-containing catalyst is characterized by ammonia temperature desorption and n-propylamine temperature desorption to exhibit catalytic activity equivalent to a metal-containing SSZ-23 zeolite.

4. The method of claim 1, wherein the metal present in the metal-containing catalyst ranges from 0.3 to 10.0%, based on the total weight of the metal-containing catalyst.

5. The method of claim 1, wherein the metal-containing catalyst is hydrothermally aged; the hydrothermally aged catalyst capable of both ammonia temperature desorption and n-propylamine temperature desorption.

6. The method of claim 1, wherein the step of incorporating the metal in to the framework of the dealuminated zeolite is accomplished by ion-exchange with the amount of Cu, Fe, Co, Zr, or Ti metal being sufficient to maintain NOx conversion performance in an exhaust gas stream containing nitrogen oxides.

7. The method of claim 6, wherein the NOx conversion performance of the freshly prepared metal-containing catalyst at about 200° C. is 72%.

8. The method of claim 6, wherein the NOx conversion performance of the freshly prepared metal-containing catalyst at about 500° C. is 45%.

9. The method of claim 1, wherein the method further comprises depositing the metal-containing catalyst on to a honeycomb substrate, a metal substrate or an extruded substrate.

10. The method of claim 1, wherein the STT-type zeolite has a particle size with D50 between about 0.1 to 50 micrometers.

11. The method of claim 1, wherein the STT-type zeolite has strong acid sites stable up to a temperature of 600° C.

12. The method of claim 1, wherein the source of the tetravalent element is fumed silica with a water content of about 2 wt % and the source of trivalent element is aluminum tri-oxide.

13. The method of claim 1, wherein a cation of the alkali metal balances the valence electrons charges in the crystalline STT-type zeolite.

14. The method of claim 13, wherein the alkali metal cation is sodium derived from sodium hydroxide or potassium derived from potassium hydroxide.

15. The method of claim 1, wherein the mixture is heated to a temperature of about 155° C.

* * * * *